US009626051B2

(12) United States Patent
Zhao et al.

(10) Patent No.: US 9,626,051 B2
(45) Date of Patent: Apr. 18, 2017

(54) TOUCH DISPLAY PANEL, MANUFACTURING METHOD THEREOF AND TOUCH DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Weijie Zhao, Beijing (CN); Xue Dong, Beijing (CN); Haisheng Wang, Beijing (CN); Lei Wang, Beijing (CN); Hongjuan Liu, Beijing (CN); Xiaoliang Ding, Beijing (CN); Shengji Yang, Beijing (CN); Yingming Liu, Beijing (CN); Tao Ren, Beijing (CN)

(73) Assignees: BOE Technology Group Co., Ltd., Beijing (CN); Beijing BOE Optoelectronics Technology Co., Ltd., Beijing (CN)

(*) Notice: Subject to any disclaimer, the term of this patent is extended or adjusted under 35 U.S.C. 154(b) by 7 days.

(21) Appl. No.: 14/436,686

(22) PCT Filed: Sep. 26, 2014

(86) PCT No.: PCT/CN2014/087605
§ 371 (c)(1),
(2) Date: Apr. 17, 2015

(87) PCT Pub. No.: WO2015/176459
PCT Pub. Date: Nov. 26, 2015

(65) Prior Publication Data
US 2016/0246403 A1    Aug. 25, 2016

(30) Foreign Application Priority Data

May 19, 2014    (CN) .......................... 2014 1 0212115

(51) Int. Cl.
G06F 3/041    (2006.01)
G06F 3/044    (2006.01)

(52) U.S. Cl.
CPC .............. G06F 3/044 (2013.01); G06F 3/041 (2013.01); G06F 2203/04103 (2013.01)

(58) Field of Classification Search
None
See application file for complete search history.

(56) References Cited

U.S. PATENT DOCUMENTS

2009/0289912 A1    11/2009    Chen et al.
2011/0248949 A1*   10/2011    Chang .................. G06F 3/044
                                                                345/174

(Continued)

FOREIGN PATENT DOCUMENTS

CN    102914920 A    2/2013
CN    102955635 A    3/2013

(Continued)

OTHER PUBLICATIONS

Jan. 20, 2015—(WO)—International Search Report and Written Opinion PCT/CN2014/087605 with English Tran.

(Continued)

Primary Examiner — Christopher R Lamb
(74) Attorney, Agent, or Firm — Banner & Witcoff, Ltd.

(57) ABSTRACT

A touch display panel, a manufacturing method thereof and a touch display device are disclosed. The touch display panel comprises: an array substrate and an opposing substrate. A common electrode layer is formed on a transparent substrate of the array substrate. Touch sensing electrodes are formed on one surface of a transparent substrate of the opposing substrate facing the array substrate. The common electrode layer is configured as first common electrodes in the display period, and at least one part of the common electrode layer (Continued)

is configured as touch driving electrodes in the touch period. The part of the common electrode layer taken as the touch driving electrodes and the touch sensing electrodes intersect each other. The touch display panel has simple manufacturing processes and can effectively reduce the manufacturing costs of the touch panel and improve the productivity.

6 Claims, 4 Drawing Sheets

(56) References Cited

U.S. PATENT DOCUMENTS

| | | | | |
|---|---|---|---|---|
| 2012/0081320 A1* | 4/2012 | Hwang | ............... | G06F 3/0418 345/173 |
| 2013/0033439 A1* | 2/2013 | Kim | ................ | G02F 1/13338 345/173 |
| 2014/0118299 A1* | 5/2014 | Wang | ................ | G06F 3/0416 345/174 |

FOREIGN PATENT DOCUMENTS

| | | |
|---|---|---|
| CN | 102955636 A | 3/2013 |
| CN | 103049156 A | 4/2013 |
| CN | 103049157 A | 4/2013 |
| CN | 103226423 A | 7/2013 |
| CN | 203133802 U | 8/2013 |
| CN | 103995613 A | 8/2014 |

OTHER PUBLICATIONS

Jul. 26, 2016—(CN)—First Office Action Appn 201410212115.7 with English Tran.

* cited by examiner ns. Obviously, the described embodiments are just a part but not all of the embodiments of the present invention. All the other embodiments obtained by those skilled in the art without creative work on the basis of the embodiments of the present invention are within the scope of protection of the present invention.

TOUCH DISPLAY PANEL, MANUFACTURING METHOD THEREOF AND TOUCH DISPLAY DEVICE

The application is a U.S. National Phase Entry of International Application No. PCT/CN2014/087605 filed on Sep. 26, 2014, designating the United States of America and claiming priority to Chinese Patent Application No. 201410212115.7 filed on May 19, 2014. The present application claims priority to and the benefit of the above-identified applications and the above-identified applications are incorporated by reference herein in their entirety.

TECHNICAL FIELD

Embodiments of the present invention relate to a touch display panel, a manufacturing method thereof and a touch display device.

BACKGROUND

Digital devices have become indispensable and important elements in people's lives and during the production. Display devices, taken as video signal output terminals of the digital devices, are configured to directly transmit information to operators and belong to necessary devices. With the development of science and technology, the display device is not limited to receive signals for display but also has the function of controlling command input. A touch display device can be used to directly enter commands through a screen and even can replace an auxiliary device for input, e.g., a keyboard.

A capacitive in-cell touch panel is obtained by directly and additionally arranging touch scanning lines and touch sensing lines on a thin-film transistor (TFT) array substrate. That is to say, two layers of indium tin oxide (ITO) strip electrodes which intersect each other in different planes are formed on a surface of the TFT array substrate and respectively taken as touch driving lines and touch sensing lines of a touch screen, and a sensing capacitor is formed at the intersection of two ITO electrodes in different planes. The working process of the capacitive in-cell touch panel is as follows: in the process of loading touch driving signals to the ITO electrodes taken as the touch driving lines, voltage signals coupled by the touch sensing lines through the sensing capacitors are detected; in the process, when the touch screen is touched by the human body, coupling capacitors are formed between the human body and touch driving electrodes as well as touch sensing electrodes in the touch screen; the coupling capacitors act on the sensing capacitors, so that the capacitance of the sensing capacitors can be changed, and hence the voltage signals coupled out by the touch sensing lines can vary; and thus, the position of the touch point can be determined according to the variation of the voltage signals.

SUMMARY

At least one embodiment of the present invention provides a touch display panel, a manufacturing method thereof and a touch display device which are used for simplifying the manufacturing process of the touch display panel and improving the productivity.

At least one embodiment of the present invention provides a touch display panel, which comprises: an array substrate and an opposing substrate. A common electrode layer is formed on a transparent substrate of the array substrate; touch sensing electrodes are formed on one surface of a transparent substrate of the opposing substrate facing the array substrate; the common electrode layer is configured as first common electrodes in the display period; at least one part of the common electrode layer is configured as touch driving electrodes in the touch period; and the part of the common electrode layer configured as the touch driving electrodes and the touch sensing electrodes intersect each other.

At least one embodiment of the present invention provides a touch display device, which comprises any foregoing touch display panel.

At least one embodiment of the present invention provides a method for manufacturing a touch display panel, which comprises: forming a common electrode layer on a transparent substrate of an array substrate, in which at least one part of the common electrode layer is formed as strip electrodes arranged at an interval; forming touch sensing electrodes on one surface of a transparent substrate of an opposing substrate facing the array substrate; and allowing the strip electrodes and the touch sensing electrodes to intersect each other after cell assembly.

BRIEF DESCRIPTION OF THE DRAWINGS

Simple description will be given below to the accompanying drawings of the embodiments to provide a more clear understanding of the technical proposals of the embodiments of the present invention. Obviously, the drawings described below only involve some embodiments of the present invention but are not intended to limit the present invention.

Figure 1:
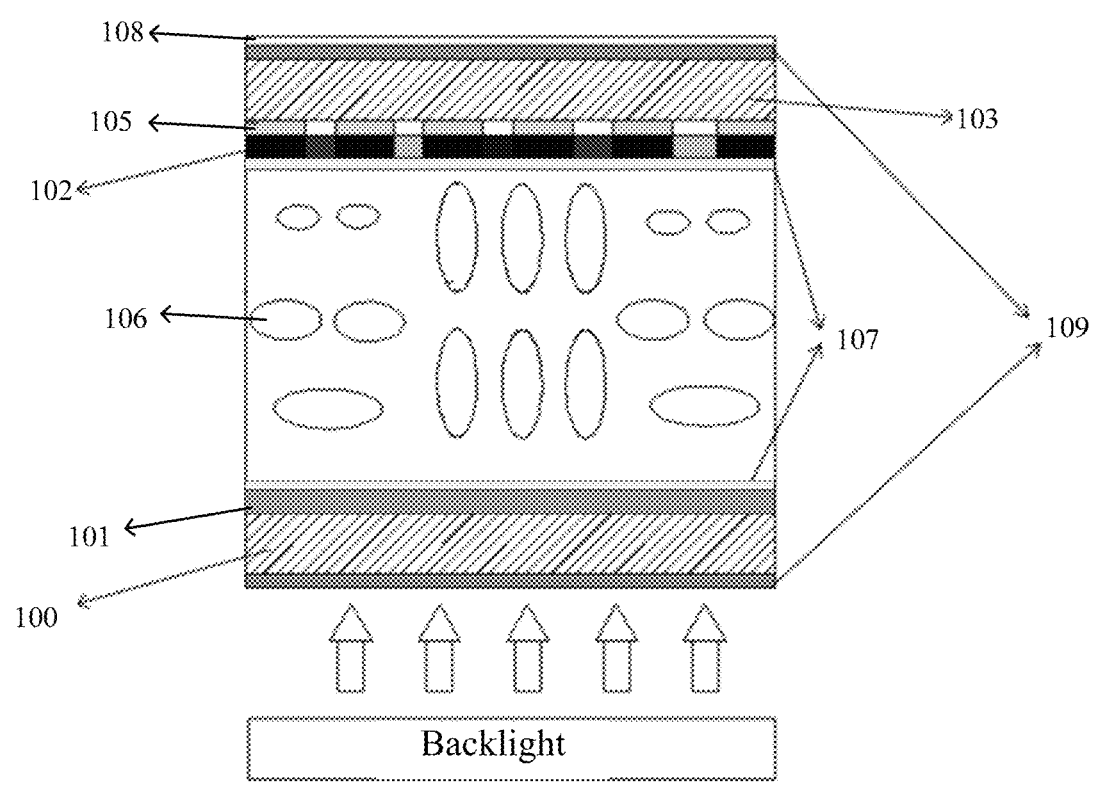
FIG. 1 is a schematic structural view of a touch display panel provided by an embodiment of the present invention.

| Reference numerals: | |
|---|---|
| 100: Transparent Substrate of Array Substrate; | 102: Black Matrix (BM); |
| 101: Common Electrode Layer; | 103: Transparent Substrate of Color Filter Substrate |
| 104: Touch Driving Electrode; | 105: Touch Sensing Electrode |
| 106: Liquid Crystal Layer; | 107: Alignment Layer    108: Overcoat |
| 109: Polarizer | 110: Second Common Electrode |

DETAILED DESCRIPTION

For more clear understanding of the objectives, technical proposals and advantages of the embodiments of the present invention, clear and complete description will be given below to the technical proposals of the embodiments of the present invention with reference to the accompanying drawings of the embodiments of the present invention. Obviously, the preferred embodiments are only partial embodiments of the present invention but not all the embodiments. All the other embodiments obtained by those skilled in the art without creative efforts on the basis of the embodiments of the present invention illustrated shall fall within the scope of protection of the present invention.

The inventors have noted that: in the structural design of the capacitive in-cell touch panel in which the touch scanning lines and the touch sensing lines are directly and additionally arranged on the array substrate, additional layers must be additionally arranged on the TFT array substrate, so that additional processes must be increased in the process of manufacturing the TFT array substrate, and hence the manufacturing costs can be increased and the productivity can be reduced.

FIG. 1 is a schematic structural view of a touch display panel provided by an embodiment of the present invention. As illustrated in FIG. 1, the touch display panel provided by the embodiment comprises: an array substrate and an opposing substrate. In one example, the opposing substrate is a color filter (CF) substrate. When the array substrate has a CF structure, the opposing substrate is not required to be a CF substrate. A common electrode layer 101 is formed on a transparent substrate 100 of the array substrate. Touch sensing electrodes (Rx) 105 are formed on one surface of a transparent substrate 103 of the CF substrate as the opposing substrate, which surface faces the array substrate. The common electrode layer 101 is configured as first common electrodes in the display period, namely the potential of the common electrode layer 101 is set to be at a common level by a driver IC. At least one part of the common electrode layer 101 is configured as touch driving electrodes (Tx) 104 in the touch period, namely the potential of the common electrode layer 101 is, for instance, square wave signals corresponding to touch driving signals. Therefore, the common electrode layer 101 is configured as the common electrodes and the touch driving electrodes in a time-sharing manner in the use process.

The part of the common electrode layer 101 taken as the touch driving electrodes intersect with the touch sensing electrodes 105.

Figure 2:
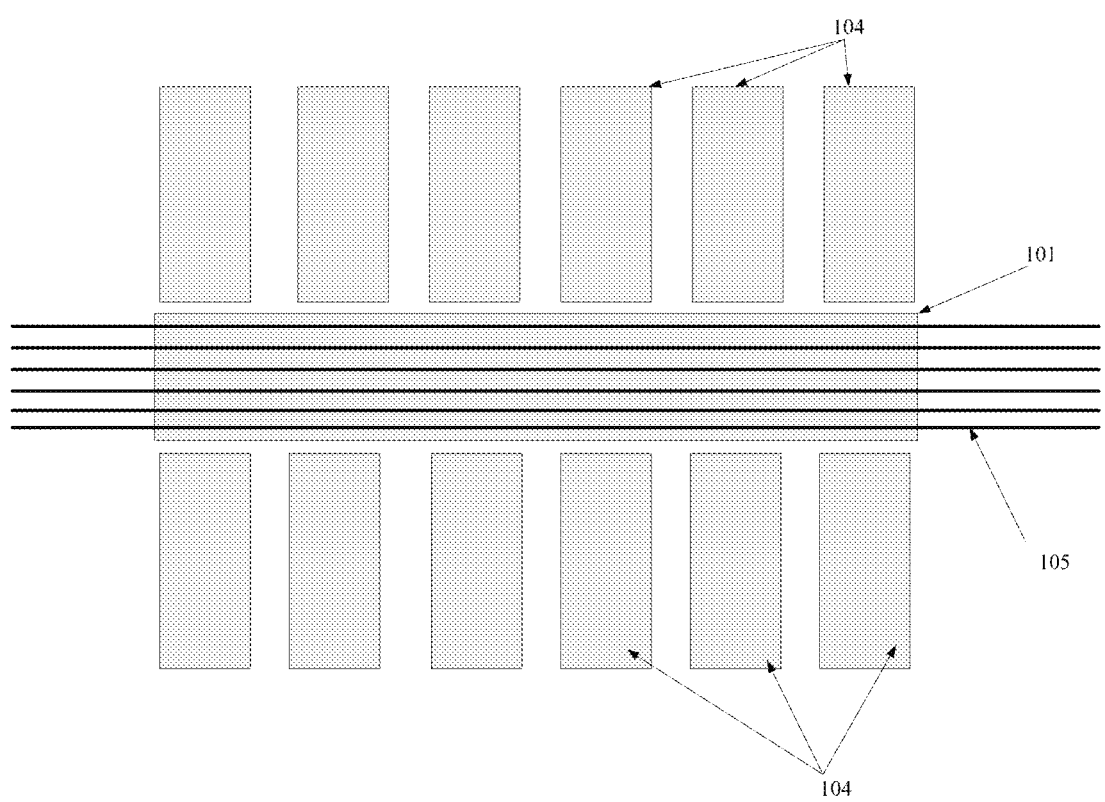
FIG. 2 is a distribution chart of touch sensing electrodes and a common electrode layer in FIG. 1.

In at least one embodiment of the present invention, in order to improve the touch effect of the touch display panel, as illustrated in FIG. 2, the extension direction of the touch sensing electrodes 105 may be perpendicular to the extension direction of the common electrode layer 101 taken as the touch driving electrodes 104, or both intersect each other in other configuration.

In at least one embodiment of the present invention, the touch sensing electrodes 105 may be ITO strip electrodes; and the foregoing common electrode layer configured as the touch driving electrodes 104 may also be a plurality of strip electrodes arranged at an interval, as shown in FIG. 2.

In the embodiment, the transparent substrate of the array substrate may be an array substrate made from glass or other transparent conductive material, which is not limited in the embodiment; and the transparent substrate of the CF substrate may be a CF substrate made from glass or other transparent conductive material, which is not limited in the embodiment.

In the touch display panel provided by at least one embodiment of the present invention, ITO electrodes are additionally arranged on one surface of the transparent substrate of the CF substrate facing the array substrate and taken as the touch sensing electrodes 105. Thus, the distance between a finger and the touch sensing electrodes (Rx) can be reduced, and hence the touch variation in the touch display panel can be effectively improved and the touch effect can be enhanced.

The array substrate further includes gate lines, data lines and a pixel unit array defined by the gate lines and the data lines. Each pixel unit includes, for instance, a switching element of a TFT and a pixel electrode. The CF substrate further includes black matrix 102 and color filters (not shown in the figure). The black matrix is configured to space the color filters arranged in an array and can improve the color contrast and reduce light leakage. Red, green, and blue color filters in the CF substrate are arranged corresponding to the pixel electrodes in the array substrate. For instance, the position of the black matrix may correspond to the position of the gate lines and the data lines arranged in the array substrate. A liquid crystal layer 106 is disposed between the CF substrate and the array substrate. In at least one embodiment of the present invention, the common electrode layer 101 is, for instance, a common electrode layer of an advanced super dimension switch (ADS) liquid crystal display (LCD) array substrate and is disposed on an array structure of the array substrate, including gate lines, data lines, TFTs and pixel electrodes, for instance, disposed on an upper surface.

In addition, as illustrated in FIG. 1, the touch display panel provided by the embodiment further comprises a polarizer 109 provided with an overcoat 108. The polarizer 109 may change the polarization direction of light to complete the LCD function.

In the embodiment, the position of the black matrix 102, the color filters, alignment layers 107 between which the liquid crystal layer 106 is disposed, and the polarizer 109 provided with the overcoat 108 in the touch display panel may be set according to the conventional technology. No detailed description will be given here in the embodiment.

In the touch display panel provided by at least one embodiment of the present invention, the common electrode layer is formed on the transparent substrate of the array substrate; the touch sensing electrodes are formed on one surface of the transparent substrate of the opposing substrate facing the array substrate; the common electrode layer is configured as the first common electrodes in the display period; and partial common electrode layer is configured as the touch driving electrodes in the touch period. Therefore, the process of independently arranging the touch driving electrodes can be avoided, and hence the manufacturing costs of the touch display panel can be reduced, and meanwhile, the productivity of the touch display panel can be improved.

In the process of application, for instance, the common electrode layer of the array substrate may be all taken as the touch driving electrodes by multiplexing in the touch period, so that the crossing-over rate of the touch sensing electrodes and the touch driving electrodes can be increased, and hence the touch variation of the touch display panel can be improved. When all the common electrode layer in the array substrate is configured as the touch driving electrodes by multiplexing, the common electrode layer is divided into mutually spaced electrode strips, connected with the touch driving circuits, and applied by touch signals in the touch period.

Because the gate lines and the data lines are disposed beneath the common electrode layer configured as the touch driving electrodes in the touch period, large capacitance will be formed between the gate lines and the data lines and the common electrode layer respectively in the touch period, and hence the resistance capacitance (RC) load of the touch driving electrodes can be increased.

Figure 3:
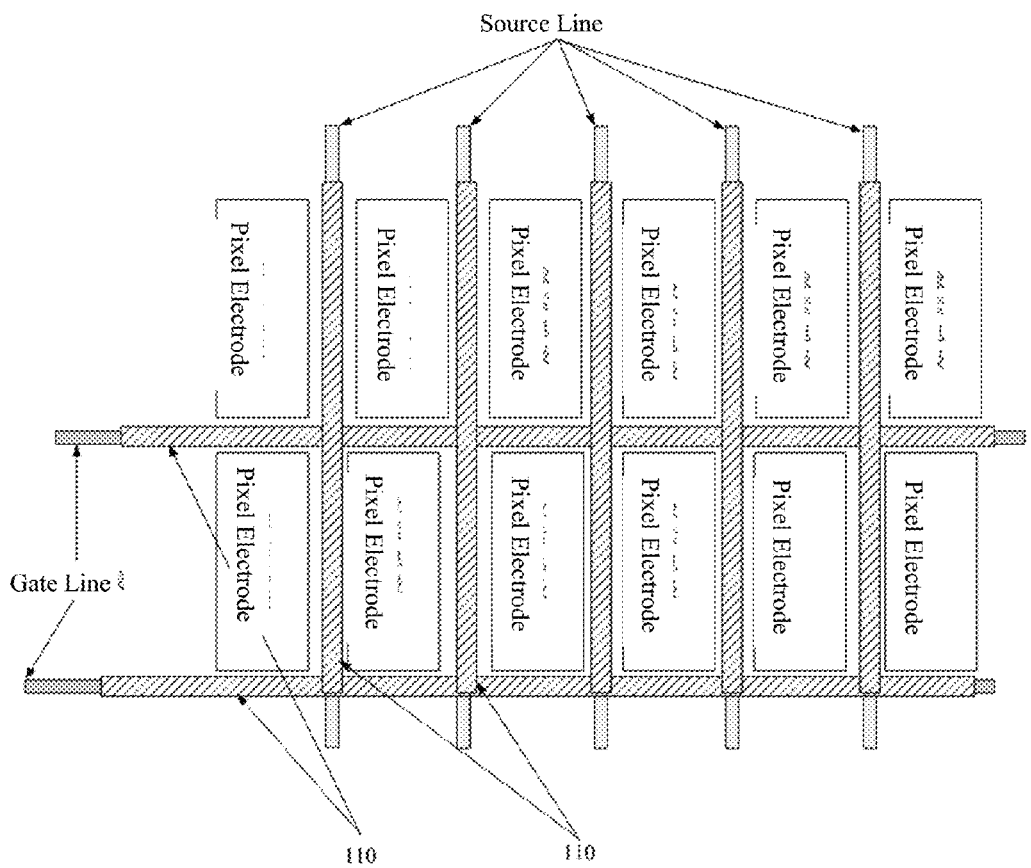
FIG. 3 is a schematic diagram illustrating the position relation of second common electrodes provided by an embodiment of the present invention.

In order to reduce the RC load of the touch driving electrodes in the touch period, in at least one embodiment of the present invention, the touch display panel may further comprise second common electrodes 110, as shown in FIG. 3.

For instance, the touch display panel may further comprise: second common electrodes disposed on the array substrate and arranged on the periphery of the pixel electrodes. The second common electrodes may at least partially cover the gate lines and/or the data lines. As illustrated in FIG. 3, the second common electrodes 110 may partially cover the gate lines and partially cover the data lines. The second common electrodes 110 and the gate lines and the data lines may be insulated from each other, for instance, insulated by an insulating layer. At this point, the second common electrodes 110 may be disposed between the array structure of the array substrate and the common electrode layer 101.

For instance, the second common electrodes may be made from ITO. That is to say, the ITO electrodes are additionally arranged on the periphery of the pixel electrodes along the direction of the gate lines and the data lines and connected with each other to form the second common electrodes 110 as a whole. The ITO electrodes in the embodiment may be disposed below the black matrix correspondingly.

Figure 4:
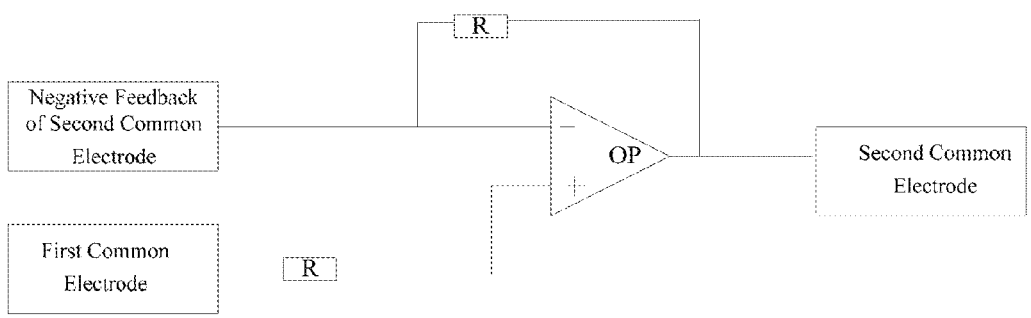
FIG. 4 is a schematic diagram illustrating the connection between first common electrodes and second common electrodes provided by an embodiment of the present invention.

The touch display panel further comprises the second common electrodes, and the voltage of the second common electrodes may be equal to the voltage of the first common electrodes. For this reason, as illustrated in FIG. 4, the second common electrodes and the first common electrodes are connected with each other through operational amplifiers so as to be physically isolated to have an equal voltage. Therefore, the voltage of the second common electrodes and the voltage of the first common electrodes may be guaranteed to be equal.

As illustrated in FIG. 4, the first common electrode is connected with a positive input end of an operational amplifier; a negative feedback of the second common electrode is connected to a negative input end of the operational amplifier; and output of the operational amplifier is connected to the ITO electrode, namely, the second common electrode, on the periphery of the pixel electrode. Therefore, the potential on the second common electrode varied in the process of charging the gate line and the data line can be guaranteed to be adjusted to be the same as the potential of the first common electrode through a negative feedback circuit. Herein, for instance, the negative feedback of the second common electrode and the second common electrode are actually disposed at different positions on the second common electrode.

It should be understood that: on the periphery of the pixel electrodes, the second common electrodes are connected with the first common electrodes through the operational amplifiers, which ensures that the physical connection between the first common electrodes and the second common electrodes can be cut off by the high impedance of the operational amplifiers if the second common electrodes and the first common electrodes are the same potential, and further reduces the RC load of the touch driving electrodes.

In at least one embodiment of the present invention, as the touch display panel is additionally provided with the second common electrodes having an equal voltage as the first common electrodes, in one aspect, the RC load of the touch driving electrodes can be reduced; in another aspect, the influence of the gate lines and data lines on the common electrodes in charging can be reduced; and hence the display effect of the touch display panel can be improved.

In the touch display panel provided by another embodiment of the present invention, the opposing substrate arranged opposite to the array substrate to form a liquid crystal cell does not include a CF structure, but a CF structure is correspondingly formed on the array substrate. In the embodiment, the array substrate may also be a color-filter on array (COA) substrate. Moreover, for instance, the black matrix may be formed on the opposing substrate or may be formed on the array substrate.

At least one embodiment of the present invention further provides a touch display device. The touch display device provided by the embodiment may comprise the touch display panel provided by any forgoing embodiment. The touch display device, for instance, may be: any product or component with display function such as e-paper, a mobile phone, a tablet PC, a TV, a display, a notebook computer, a digital picture frame and a navigator.

The touch display device provided by the embodiment can preferably improve the display effect and the touch effect, and meanwhile, can simplify the manufacturing process of the touch display device, reduce the manufacturing costs and improve the productivity of the touch display device.

Figure 5:
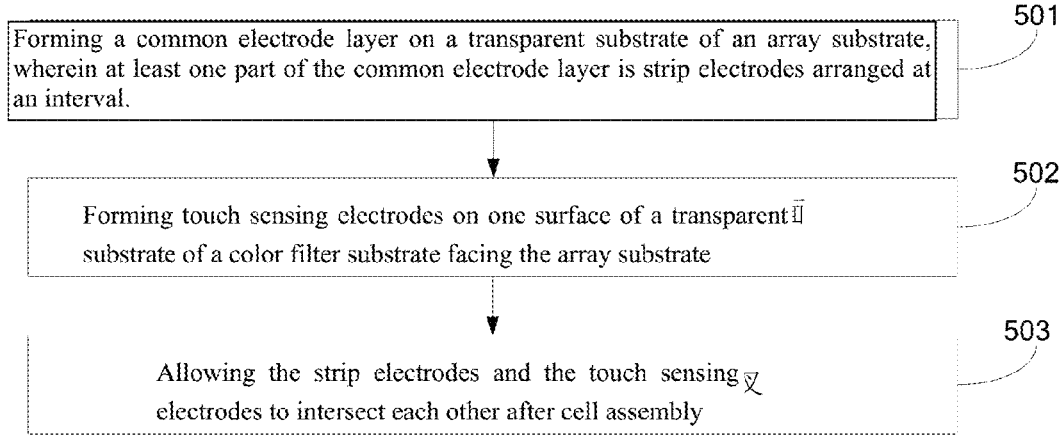
FIG. 5 is a flowchart of a method for manufacturing a touch display panel provided by an embodiment of the present invention.

As illustrated in FIG. 5 which is a flowchart of a method for manufacturing a touch display panel, provided by an embodiment of the present invention, the method for manufacturing the touch display panel, provided by the embodiment, is as follows:

501: forming a common electrode layer on a transparent substrate of an array substrate, in which at least one part of the common electrode layer is formed as strip electrodes arranged at an interval;

502: forming touch sensing electrodes on one surface of a transparent substrate of a color filter substrate facing the array substrate; and

503: allowing the strip electrodes and the touch sensing electrodes to intersect each other after cell assembly.

Figure 6:
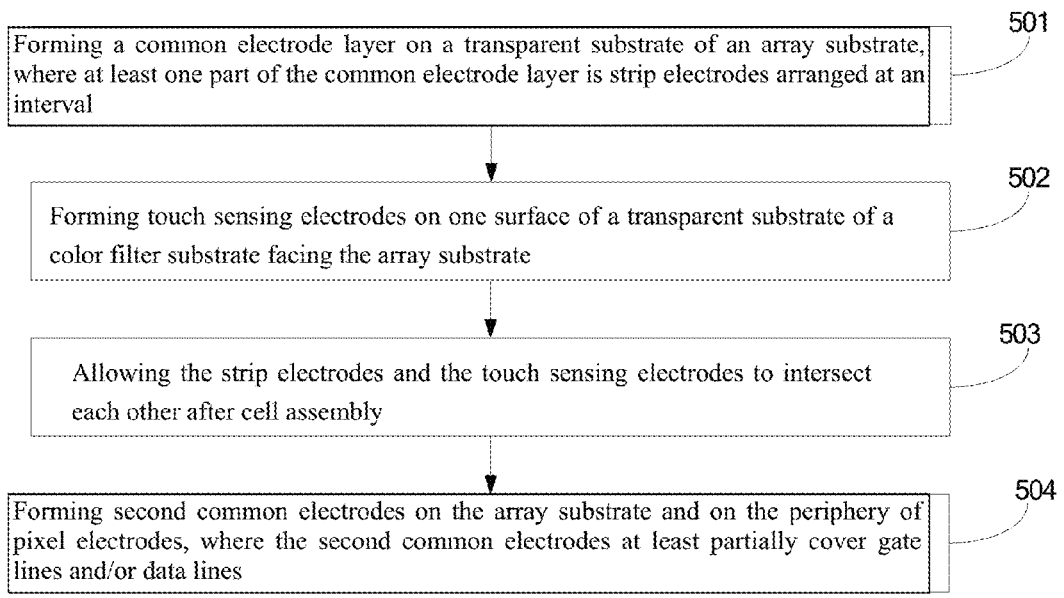
FIG. 6 is a flowchart of a method for manufacturing a touch display panel provided by an embodiment of the present invention.

In at least one embodiment of the present invention, the manufacturing method may further comprise the following step 504, as shown in FIG. 6:

504: forming second common electrodes on the array substrate and on the periphery of pixel electrodes, in which the second common electrodes at least partially cover gate lines and/or data lines.

Of course, the manufacturing method further comprises processes for forming other structures. No further description will be given here. In addition, the above steps are not limited to the aforesaid order.

The method for manufacturing the display panel, provided by at least one embodiment of the present invention, can reduce the manufacturing process of the display panel and hence reduce the manufacturing costs of the display panel and improve the productivity of the display panel.

In the method for manufacturing the display panel, provided by another embodiment of the present invention, the opposing substrate arranged opposite to the array substrate to form the liquid crystal cell does not include a CF structure while the CF structure is correspondingly formed on the array substrate. In the embodiment, the array substrate may also be a COA substrate. Moreover, for instance, the black matrix may be formed on the opposing substrate and may also be formed on the array substrate.

The foregoing is only the preferred embodiments of the present invention and not intended to limit the scope of protection of the present invention. The scope of protection of the present invention should be defined by the appended claims.

The application claims priority to the Chinese patent application No. 201410212115.7, filed May 19, 2014, the disclosure of which is incorporated herein by reference as part of the application.

The invention claimed is:

1. A touch display panel, comprising:
an array substrate comprising a first transparent substrate;
an opposing substrate comprising a second transparent substrate;
a common electrode layer formed on the first transparent substrate;
touch sensing electrodes formed on one surface of the second transparent substrate of the opposing substrate, the one surface facing the array substrate; and
gate lines and data lines arranged in the array substrate,
wherein the common electrode layer is configured as first common electrodes in a display period, and at least one part of the common electrode layer is configured as touch driving electrodes in a touch period,
wherein the touch sensing electrodes and the at least one part of the common electrode layer configured as the touch driving electrodes intersect each other,
wherein second common electrodes are disposed on the array substrate and arranged on a periphery of pixel electrodes, and the second common electrodes at least partially cover the gate lines and the data lines,
wherein the first common electrodes and the second common electrodes are connected with each other through operational amplifiers so as to be physically isolated, and a voltage of the first common electrodes is equal to a voltage of the second common electrodes, and
wherein the first common electrodes are connected with positive input ends of the operational amplifiers, negative feedbacks of the second common electrodes are connected to negative input ends of the operational amplifiers, and outputs of the operational amplifiers are connected to the second common electrodes.

2. The touch display panel according to claim 1, wherein the at least one part of the common electrode layer configured as the touch driving electrodes is perpendicular to the touch sensing electrodes.

3. The touch display panel according to claim 1, wherein the at least one part of the common electrode layer configured as the touch driving electrodes is strip electrodes arranged at an interval.

4. The touch display panel according to claim 1, wherein the second common electrodes are made from indium tin oxide.

5. A touch display device, comprising the touch display panel according to claim 1.

6. A method for manufacturing a touch display panel, comprising:
forming a common electrode layer on a transparent substrate of an array substrate, wherein at least one part of the common electrode layer is formed as strip electrodes arranged at an interval;
forming touch sensing electrodes on one surface of a transparent substrate of an opposing substrate, the one surface facing the array substrate;
allowing the strip electrodes and the touch sensing electrodes to intersect each other after cell assembly;
forming gate lines and data lines in the array substrate;
forming second common electrodes on the array substrate and on a periphery of pixel electrodes, wherein the second common electrodes at least partially cover the gate lines and the data lines; and
providing operational amplifiers, connecting the common electrode layer to positive input ends of the operational amplifiers, connecting negative feedbacks of the second common electrodes to negative input ends of the operational amplifiers, and connecting outputs of the operational amplifiers to the second common electrodes.

* * * * *